W. COOPER.
METHOD OF REFRIGERATION.
APPLICATION FILED MAY 26, 1909.
955,582.
Patented Apr. 19, 1910.
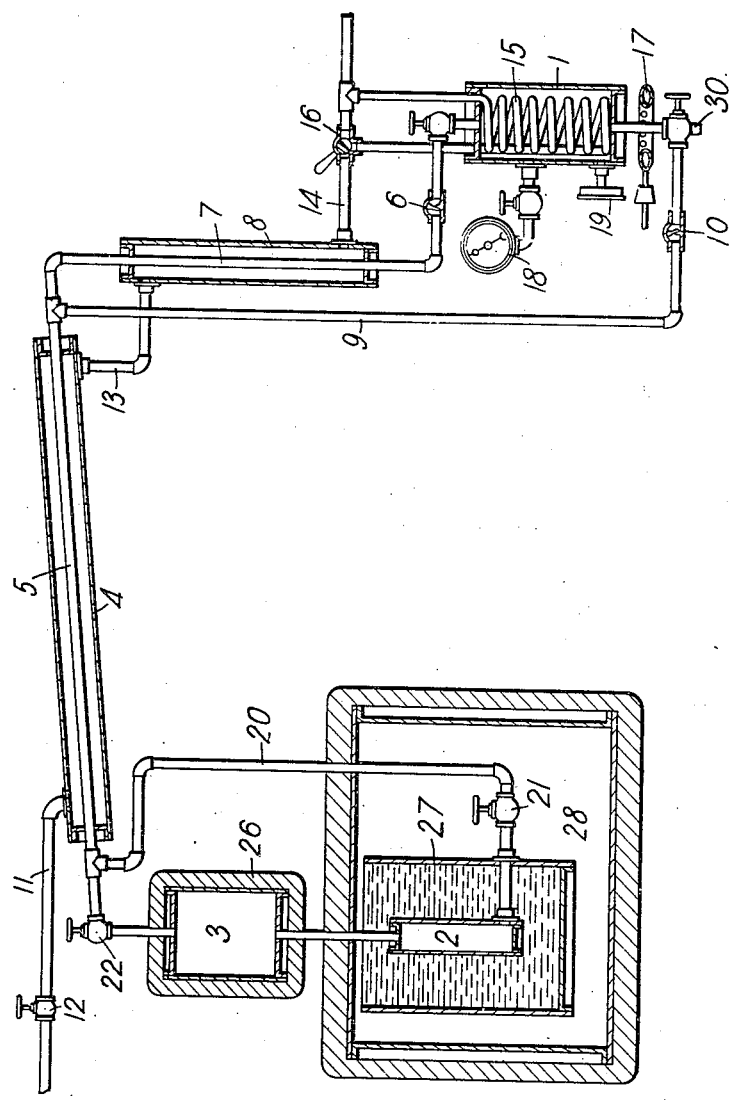

UNITED STATES PATENT OFFICE.

WILLIAM COOPER, OF PITTSBURG, PENNSYLVANIA, ASSIGNOR TO GENERAL REFRIGERATING COMPANY, OF PITTSBURG, PENNSYLVANIA, A CORPORATION OF WEST VIRGINIA.

METHOD OF REFRIGERATION.

955,582.  Specification of Letters Patent.  Patented Apr. 19, 1910.

Application filed May 26, 1909. Serial No. 498,537.

*To all whom it may concern:*

Be it known that I, WILLIAM COOPER, a resident of Pittsburg, in the county of Allegheny and State of Pennsylvania, have invented a new and useful Improvement in Methods of Refrigeration, of which the following is a specification.

This invention relates to methods of producing artificial refrigeration, and has special reference to such as involve the alternate absorption and evaporation of gases and liquids, and which generally are known as absorption systems.

The object of the invention is to provide a method of the kind indicated which is efficient, reliable, and particularly by means of which a uniform temperature can be maintained.

In carrying out my method I utilize two liquids which boil or evaporate at materially different temperatures, the boiling point of one being sufficiently low to produce the desired refrigeration within the range of working pressures, and the liquid having the higher boiling point being capable of absorbing the vapor of the other liquid, or in other words, the vapor or gas produced by the boiling or evaporation of the liquid having the lower boiling point must be readily soluble in the other liquid. The amount of gas or vapor which may be absorbed by the liquid is dependent upon the temperature of the liquid and the pressure exerted upon it, the higher the temperature at any pressure and the lower the pressure at any temperature, the less the absorption; consequently, if the liquid has absorbed a maximum amount of gas at a given temperature and pressure, an increase in temperature will expel a portion of the gas or vapor absorbed, which gas or vapor is liquefied by reducing its temperature below its liquid boiling point at the existing pressure.

In carrying out my method I prefer to employ water for the liquid having the higher boiling point and ammonia for the liquid having the lower boiling point, although my invention is not restricted in this regard, as any suitable fluids having the necessary properties may be employed. Ammonia is especially well adapted for this purpose, since it is highly soluble in water at ordinary temperatures and pressures and is easily liquefied within the range of moderate working pressures and temperatures.

In general the method consists in alternately distilling and absorbing the refrigerating agent, that is, distilling the ammonia from the water and then absorbing the same therein, condensing the vapors formed during the distillation period, and causing the same to evaporate or expand during the absorption period, thereby producing the refrigerating effect.

The invention comprises particularly certain additions to the above method to increase the efficiency and to maintain a constant or substantially uniform refrigerating effect, such as by so carrying on the method as to always maintain the evaporation or expanding device full of the liquid anhydrous refrigerating agent and causing said agent during its most active periods to congeal a liquid which acts as a reservoir of cold to absorb heat from the refrigeration space during the distillation periods and the periods of lesser activity of the evaporation and expansion of the refrigerating agent, as well as in the regulation of the absorption or evaporation of the refrigerating agent, as will herein more fully appear.

The accompanying drawing shows diagrammatically apparatus suitable for carrying out my method.

The system illustrated in the drawings comprises a receptacle 1, commonly known as an ammonia boiler or still, in which the ammonia vapors are distilled from the solution, but which according to my method also acts as an absorber when cool to absorb the ammonia gas in the solution; a receptacle 2 commonly known as an evaporator or expansion apparatus; a storage reservoir 3 which communicates with the evaporator 2, and a condenser 4 which is shown interposed between the still or boiler 1 and the storage tank 3. Communication is established between the still or boiler 1 and storage reservoir 3 by means of a pipe 5. The storage reservoir 3 need not necessarily communicate directly with the condenser, but it must communicate with the evaporator or expansion apparatus, since it is intended to keep the latter full of anhydrous liquid refrigerant at all times. A check valve 6 is located in the pipe 5 near the still 1 and so arranged that fluid may escape from said still into the pipe 5 which extends through the condenser and is slightly inclined so that it drains into the storage reservoir and evaporator 2. The vertical portion 7 of said pipe is surrounded by a jacket 8 which forms a second condenser through which the cooling fluid from the first condenser 4 may pass. This second cooling device may be called a subcondenser or dehydrator for condensing from the fluid any water or steam which may be formed in the boiler or still. From some point in the pipe 5 between the condenser 4 and the still, and preferably from a point between the condenser and subcondenser, a return pipe 9 is provided which is connected to the bottom of the boiler or still. A check valve 10 is preferably located in this return pipe in order to prevent fluid from passing out from the boiler or still in this direction.

The condenser 4 comprises, as shown, a jacket which surrounds a material length of the inclined section of the pipe 5. It is supplied with water or other cooling fluid from any convenient source through a pipe 11 provided with a cut-off and regulating valve 12 and with an escape or outlet through pipe 13 which leads to the subcondenser 8. The latter is provided with an outlet pipe 14 which may communicate directly with a waste pipe or with a cooling coil 15 in the boiler or still 1, according to the position occupied by a three-way cock 16. The still or boiler is provided with any suitable form of heater 17, a pressure gage 18 and a suitable pressure relieving device 19. A drainage or blow-out pipe 20 is connected to the lower end of the evaporator or expansion device 2 for the purpose of draining the same from any water which may find its way into the same. This drainage or blow-out pipe may lead directly to the lower end of the still or boiler, in which case it would drain by gravity, or it may lead back to the pipe 5, as shown, in which case the water will be blown out by accumulated pressure when the valve 21 in said pipe 20 is opened and the valve 22 at the upper end of storage reservoir 3 is closed.

The storage reservoir 3 is very thoroughly insulated against external heat absorption by the coating or jacket 26 so that no evaporation of the anhydrous liquid refrigerant can here take place. The evaporator or expansion device 2 is immersed in a bath of brine or other suitable congealable liquid contained in a tank or receptacle 27. This brine or liquid is so regulated that its freezing point corresponds approximately to the desired temperature of refrigeration, so that by freezing and thawing said liquid the temperature of the chamber or refrigerating space 28 may be maintained at substantially a constant value. By varying the strength of the brine it is possible to regulate the temperature in the refrigerating space and obtain any desired temperature.

The operation of the system to carry out my method is as follows: We will assume that cooling water is flowing through the condenser 4 and the sub-condenser or dehydrator 8; that the boiler or still 1 is filled with a strong solution of ammonia at a low temperature; that the evaporator or expansion device 2 is full of liquid anhydrous ammonia, and that the insulated reservoir 3 is practically empty. Heat is now applied to the boiler 1 so that the ammonia gas contained in the solution in said boiler is driven off and through the condenser 4. Here it is condensed into liquid ammonia and flows into storage reservoir 3. When heat is first applied to the boiler 1 the storage reservoir 3 may be practically empty, but it is desirable that the evaporator or expansion device 2 be full of liquid ammonia, in order that the ammonia gas being distilled in the boiler 1 shall not enter the evaporator or expansion device and there condense, as this would necessitate the giving off of heat in said evaporator and the effects of the previous refrigerating charge would be to that extent nullified. It is therefore desirable in carrying out the method that the heat under the boiler 1 be started while the evaporator or expansion device is still full of liquid ammonia, that is, just before the reservoir 3 becomes entirely empty. As the application of heat to the boiler is continued the storage reservoir 3 is gradually filled with liquid ammonia, this process being stopped when the solution in the boiler is weakened to such an extent that there is no longer any advantage in applying more heat. As soon as the heat is shut off the temperature of the liquid in the boiler decreases, and in order to aid the cooling of the boiler, water may be passed through the cooling coil 15 by properly setting cock 16. As the boiler cools the gas above the surface of the solution therein is absorbed and the pressure within the apparatus reduced. As no gas can enter the top of the boiler, the pressure in the boiler is necessarily lowered until the gas is forced in at the bottom through the pipe 9, from which gas will bubble up through the weak solution in the boiler and be promptly absorbed. As this action continues the pressure in the reservoir 3 and in evaporator 2 is gradually reduced until it reaches the pressure corresponding to the temperature of the refrigerator. Up to this point no gas is produced in the evaporator for the reason that the temperature there is low. The ammonia in storage reservoir 3, which was at the temperature of the condenser when the absorption began, is now lowered in temperature until it is at the temperature of the evaporator 2, after which no action takes place and now ammonia gas is formed in the reservoir, the action being transferred to the evaporator 2.

No ammonia gas is formed in reservoir 3 for the reason that it is insulated against the absorption of external heat by its jacket 26, so that it is impossible, according to well known principles, for the liquid ammonia contained in it to boil. Consequently the expansion or evaporation is practically confined to the evaporator 2, after the liquid in the reservoir is at the temperature of the liquid in the evaporator. The liquid ammonia in the evaporator 2 continues to boil and take up heat from the refrigerator until the solution in the generator is again saturated to a maximum degree at the pressure of the vapor and at the temperature of the water in the cooling coil 15 in the boiler. After this point is reached the cycle is again repeated by applying heat to the boiler 1.

Since the rate of absorption of the ammonia gas in the liquid in the boiler is dependent upon the temperature of said liquid, being greater when the water is cool than when it is warm, it is obvious that the rate of absorption, and consequently the rate of evaporation or expansion of the ammonia in the evaporator or expansion device 2, can be regulated by properly regulating the temperature of the water in the boiler, which can be effected by regulating the flow of cooling water through the coil 15, such as by means of valve 12, so that the solution in the boiler will be cooled at a rate corresponding to the rate of desired absorption of the ammonia gas.

During the absorption of the ammonia gas by the solution in the boiler the action is more rapid at first when the solution is weak than at the end of the process when the solution is approaching saturation. This condition would tend to make the temperature of the refrigerator vary if the heat were taken up directly by the liquid ammonia. So too, during the distillation period no evaporation or expansion takes place in the device 2, during which period there would be ordinarily no refrigeration produced. To avoid any variations in temperature in the refrigerator due to the above two causes the evaporator or expansion apparatus 2 is immersed in vessel 27 in a brine of the proper strength to freeze at the desired temperature to be maintained in the refrigerator, and which brine, or a portion thereof, is frozen during the period when the absorption is most rapid, and melts when the absorption is slow or none at all, thus producing a reservoir of refrigeration in the form of ice, which is drawn upon during the time that the absorption is less rapid and during the period of distillation. In this manner the temperature in the refrigerator can be kept constant notwithstanding the intermittent operation of the method. This, however, is not claimed in this application, but is claimed in an application filed February 12, 1910, Serial No. 543,561, which is a division of this application.

In carrying out the method it is preferred to use a very strong solution of ammonia in the system, the strength of the solution varying from 50% to 75%, instead of merely using the ordinary commercial aqua-ammonia which is approximately a 30% solution. This, however, is not claimed in this application, but is claimed in a companion application, filed May 26, 1909, Serial No. 498,538.

In cool weather or under certain conditions it may be desirable to reduce the amount of refrigeration which is supplied. While this is automatically taken care of by the freezing of the brine, it can be still further controlled by the amount of ammonia distilled out at each cycle, or making the cycles cover a longer period of time.

The apparatus herein shown is similar to that shown, described and claimed in my application filed December 6, 1907, Serial No. 405,385, and the method herein described and claimed is the method which is disclosed in said application.

What I claim is:

1. The method of refrigeration consisting in intermittently and alternately distilling and absorbing a refrigerating agent, and during the distillation period condensing the vapors to a liquid and conducting the same to evaporation or expansion apparatus, and there permitting the same to evaporate or expand and during both the distillation and absorption periods maintaining the evaporation or expansion device full of liquid refrigerating agent.

2. The method of refrigeration consisting in intermittently and alternately distilling and absorbing a refrigerating agent, and during the distillation period condensing the gaseous agent to a liquid and conducting the same to evaporation or expansion apparatus and therein permitting the same to expand or evaporate and reabsorbing the same in the liquid, and controlling the rate of absorption by regulating the temperature of the absorbing liquid.

In testimony whereof, I have hereunto set my hand.

WILLIAM COOPER.

Witnesses:
 B. B. POWELL,
 T. C. REED.